United States Patent
Schmauder (10) Patent No.: US 8,248,004 B2
(45) Date of Patent: Aug. 21, 2012

(54) MACHINE TOOL WITH A FUNCTIONAL UNIT HAVING A LINEAR DRIVE AND LINEAR DRIVE FOR SAME

(75) Inventor: Frank Schmauder, Metzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 656 days.

(21) Appl. No.: 12/145,968

(22) Filed: Jun. 25, 2008

(65) Prior Publication Data

US 2009/0015181 A1 Jan. 15, 2009

(30) Foreign Application Priority Data

Jun. 30, 2007 (EP) .................................... 07012868

(51) Int. Cl.
*H02P 1/00* (2006.01)

(52) U.S. Cl. ......................................... 318/135; 318/687

(58) Field of Classification Search .................. 318/135, 318/687, 560, 567, 9, 15
See application file for complete search history.

(56) References Cited

U.S. PATENT DOCUMENTS

| | | | |
|---|---|---|---|
| 4,812,725 A * | 3/1989 | Chitayat | 318/625 |
| 5,537,186 A * | 7/1996 | Korenaga et al. | 355/53 |
| 5,763,965 A | 6/1998 | Bader | |
| 6,072,183 A * | 6/2000 | Itoh et al. | 250/492.2 |
| 6,130,490 A * | 10/2000 | Lee | 310/12.06 |
| 6,586,706 B2 * | 7/2003 | Erlenmaier et al. | 219/121.67 |
| 6,703,806 B2 * | 3/2004 | Joong et al. | 318/649 |
| 6,720,683 B2 * | 4/2004 | Bundschu et al. | 310/12.27 |
| 6,817,104 B2 * | 11/2004 | Kaneko et al. | 33/1 M |
| 6,841,911 B2 * | 1/2005 | Kim et al. | 310/114 |
| 6,927,505 B2 * | 8/2005 | Binnard et al. | 310/12.01 |
| 7,084,538 B2 * | 8/2006 | Takashima | 310/90.5 |
| 2002/0140296 A1 | 10/2002 | Ebihara | |

FOREIGN PATENT DOCUMENTS

| | | |
|---|---|---|
| DE | 19601018 | 8/1996 |
| EP | 0 087 284 | 8/1983 |
| EP | 0871284 A2 | 10/1998 |
| EP | 1287946 | 3/2003 |
| GB | 2 179 279 | 3/1987 |
| JP | 60-22245 | 2/1985 |
| JP | 6022245 | 2/1985 |
| JP | 200218665 A | 1/2002 |
| JP | 2002267782 A | 9/2002 |

OTHER PUBLICATIONS

International Search Report for corresponding European Application No. EP 07 01 2868, mailed Dec. 4, 2007, 4 pages.
Office Action from corresponding Japanese Application No. 2008-161123, mailed Aug. 24, 2011, 3 pages, English translation, 4 pages.

* cited by examiner

*Primary Examiner* — Rina Duda
(74) *Attorney, Agent, or Firm* — Fish & Richardson P.C.

(57) ABSTRACT

A machine tool is provided that has a linear drive by means of which a movement unit connected in motion with a functional unit is movable in two axis directions of a movement plane. The linear drive includes two drive units. The primary parts or the secondary parts of the two drive units are attached to the movement unit. The primary part or the secondary part of the one drive unit is disposed in that case on that side of the movement unit which, perpendicularly to the movement plane of the movement unit, is opposite the side of the movement unit provided with the primary part or the secondary part of the other drive unit.

16 Claims, 7 Drawing Sheets

MACHINE TOOL WITH A FUNCTIONAL UNIT HAVING A LINEAR DRIVE AND LINEAR DRIVE FOR SAME

CROSS REFERENCE TO RELATED APPLICATION

This application claims priority under 35 USC §119(a) from European patent application EP 07 012 868.1, filed Jun. 30, 2008. The complete disclosure of this priority application is incorporated herein by reference.

TECHNICAL FIELD

This invention relates to a machine tool with a functional unit having a linear drive, and to linear drives for use in such machine tools.

BACKGROUND

EP 1 287 946 A1 discloses a machine tool having a functional unit in the form of a laser cutting head. The latter is movable in a vertical y-z plane by means of two linear motors. The first linear motor drives linear bearings, to which the laser cutting head is attached and which form a movement unit, in the z-direction; the second linear motor causes movement of a slide, provided with the linear bearings and the laser cutting head, in the y-direction. The two linear motors each comprise a primary part with an exciter coil and a secondary part with permanent magnets. The primary part of the first linear motor, which is assigned to the z-direction, is arranged on one side of a primary part housing. The primary part of the second linear motor, which is assigned to the y-direction, is situated on the side of the primary part housing which, perpendicularly to the y-z-plane, is the opposite side of the primary part housing. The secondary part for the z-direction is mounted on the side towards the cutting head. The secondary part for the y-direction is attached to a machine bridge extending in the y-direction. During movements of the slide and the laser cutting head in the y-direction, the linear motor provided for that direction has to move along with it at the same time, i.e. has to "carry", the entire linear motor for the z-direction. Owing to the side-by-side arrangement of the two linear motors and the linear bearings and the laser cutting head, a relatively high moment load acts on the guide system of the linear motor for the y direction.

SUMMARY

The invention relates to a machine tool having a functional unit and a linear drive for the functional unit, in which the functional unit is connected in motion with a movement unit and the movement unit is movable by means of the linear drive in two axis directions of a movement plane. The linear drive comprises two drive units, each of which has a primary part and secondary part disposed opposite the primary part. Each drive unit is provided for movement of the movement unit in one of the axis directions of the movement plane of the movement unit.

The invention further relates to a linear drive for driving a movement unit connectable in motion with a functional unit of a machine tool, wherein the linear drive comprises two drive units each of which has a primary part and has a secondary part disposed opposite the primary part and each of which defines one axis direction of a movement plane of the movement unit.

The movement unit is arranged between the drive units. As a result, it is not necessary in either of the axis (movement) directions for the drive unit provided for the respective other movement direction to be entirely carried along at the same time. Consequently, the masses to be accelerated in the movement of the movement unit and the associated functional unit of machine tools according to the invention are reduced to a minimum. This makes it possible for compact linear drives to be constructed using drive components and guide devices of relatively small overall dimensions. To operate such linear drives, relatively small driving capacities are sufficient, or rather the linear drives disclosed herein are already extraordinarily powerful with conventional driving capacities. Furthermore, the "central" arrangement of the movement unit has the effect of minimizing the moment load to which the guide systems of the drive units are subjected. The guide system of neither drive unit is loaded by the entire other drive unit. The minimization of the moment load of the guide systems of the drive units also allows linear drives according to the invention to be obtained using drive and guide devices of small overall dimensions. In addition, particular precision is obtained in the movements executed by the movement unit and hence also by the associated functional unit. Correspondingly, it turns out that, owing to the central arrangement of the movement unit, transverse forces that occur between the primary part and the secondary part of a drive unit by reason of their function are at least partly compensated for by the transverse forces produced at the drive unit on the opposite side of the movement unit. Owing to that transverse force compensation, at most small loads have to be dissipated via the guide systems of the drive units.

In some implementations, passive elements are used as secondary parts. In some cases the primary part comprises an exciting coil and the secondary part comprises a permanent magnet. Supply and regulation of exciting currents is in some cases necessary only for the primary part.

In a preferred embodiment of the invention, the secondary parts of both drive units of the linear drive are attached to the movement unit. The movement unit is accordingly provided with the passive parts of the drive units. There is consequently no necessity for supply lines to be carried along during the movements of the movement unit. In addition, the passive secondary parts of the drive units have a smaller mass than the active primary parts. Accordingly, in the movements of the movement unit only particularly small masses have to be accelerated.

In the interests of an especially compact construction of the arrangement in its entirety, the linear drive may be configured so that no drive-related forces in the transverse direction of the movement plane of the movement unit are absorbed. In an ideal case, the use of separate guide devices for the movement unit is unnecessary.

In some implementations, the linear drive is configured to regulate the exciting currents of the primary parts of the drive units so that, during guiding of the movement unit, no transverse forces are absorbed. Alternatively, or in addition, the drive units may be structurally configured so that, during guiding of the movement unit, no transverse forces are absorbed.

In some embodiments an especially simple structural configuration and especially simple control of the drive units are provided. Owing to the use of drive units of the same kind for both directions of movement of the movement unit, for example the same inertia of mass has to be taken into consideration for both directions of movement.

The arrangements described herein are particularly advantageous and particularly relevant to practical application in the case of machine tools in the form of laser processing machines which use a laser processing head as a functional unit.

The details of one or more embodiments of the invention are set forth in the accompanying drawings and the description below. Other features and advantages of the invention will be apparent from the description and drawings, and from the claims.

DETAILED DESCRIPTION

Figure 1:
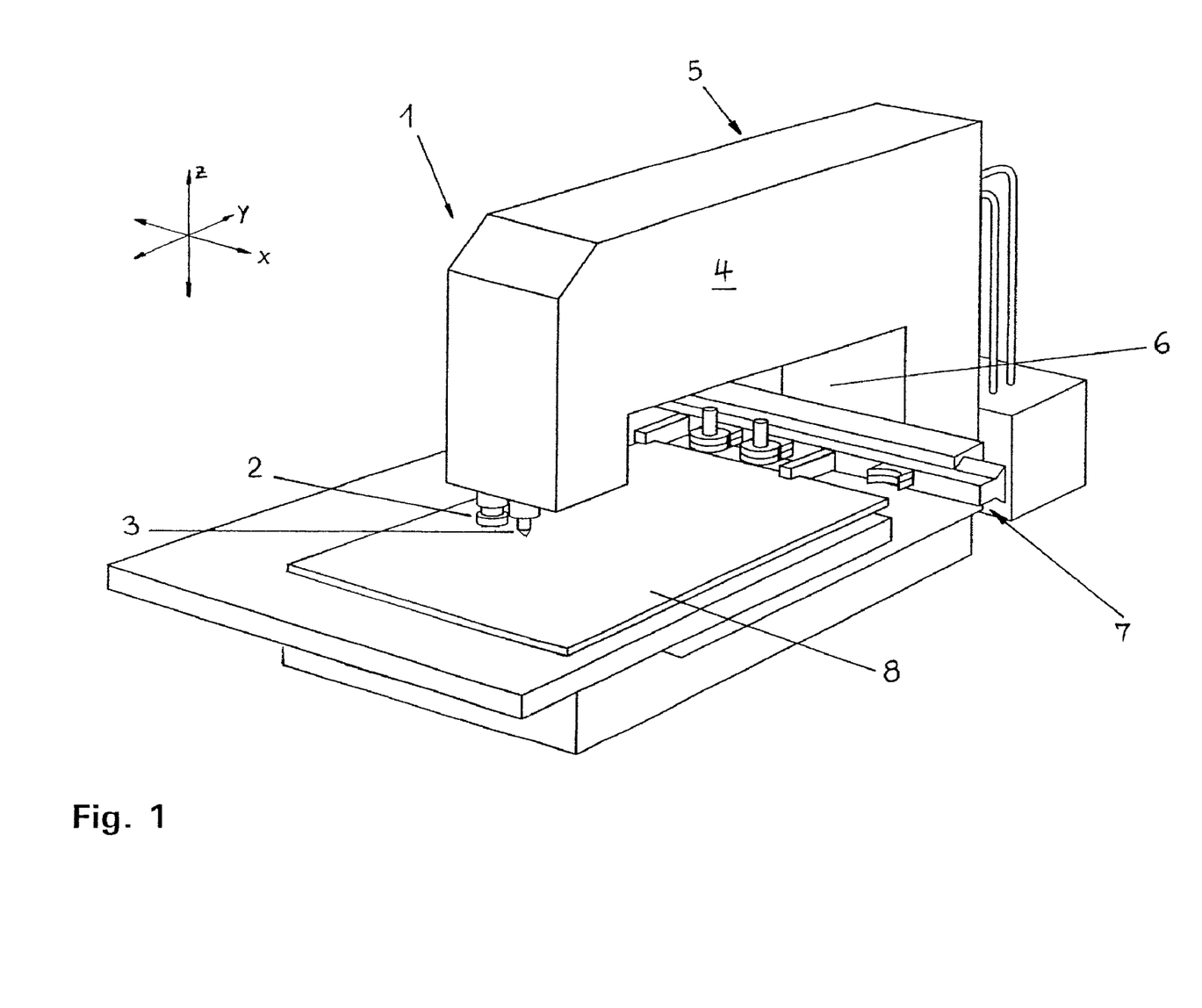
FIG. 1 shows a combined punching/laser cutting machine having a punching head and having a laser cutting head.

According to FIG. 1, a machine tool 1 is in the form of a combined punching/laser cutting machine. The machine tool 1 is therefore provided with a punching head 2 and with a further functional unit in the form of laser cutting head 3. Both the punching head 2 and the laser cutting head 3 are disposed at the free end of an upper frame leg 4 of a C-shaped machine frame 5. Accommodated in a throat 6 of the machine frame 5, there is a conventional coordinate guide 7. The latter serves to move a metal sheet 8 to be processed relative to the punching head 2 and the laser cutting head 3 in the manner required for processing thereof. Relative movement of metal sheet 8 and laser cutting head 3 may also be obtained by movement of the laser cutting head 3 relative to the metal sheet 8. The possible movements of the laser cutting head 3 are shown in FIG. 1 by coordinate axes x, y, z.

The movements of the laser cutting head 3 in the direction of the coordinate axes x, y, z are produced by means of a linear drive 9, the construction and mode of operation of which will be apparent in detail by reference to FIGS. 2 to 5.

Figure 2:
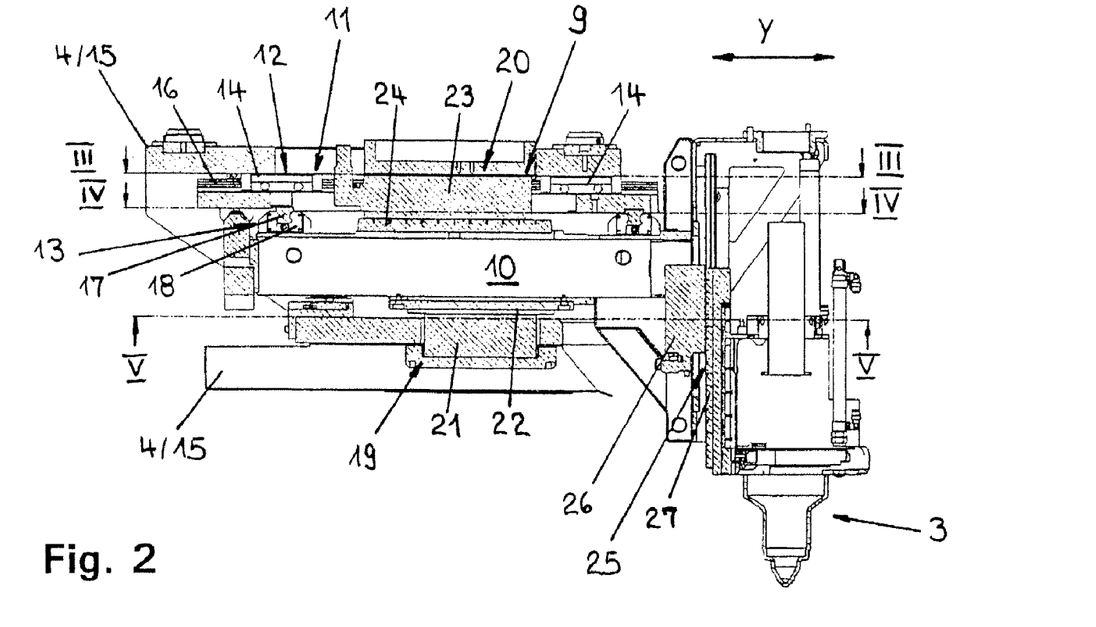
FIG. 2 is a sectional view of a first type of laser cutting head, including an associated linear drive for use on the punching/laser cutting machine shown in FIG. 1.
Figure 3:
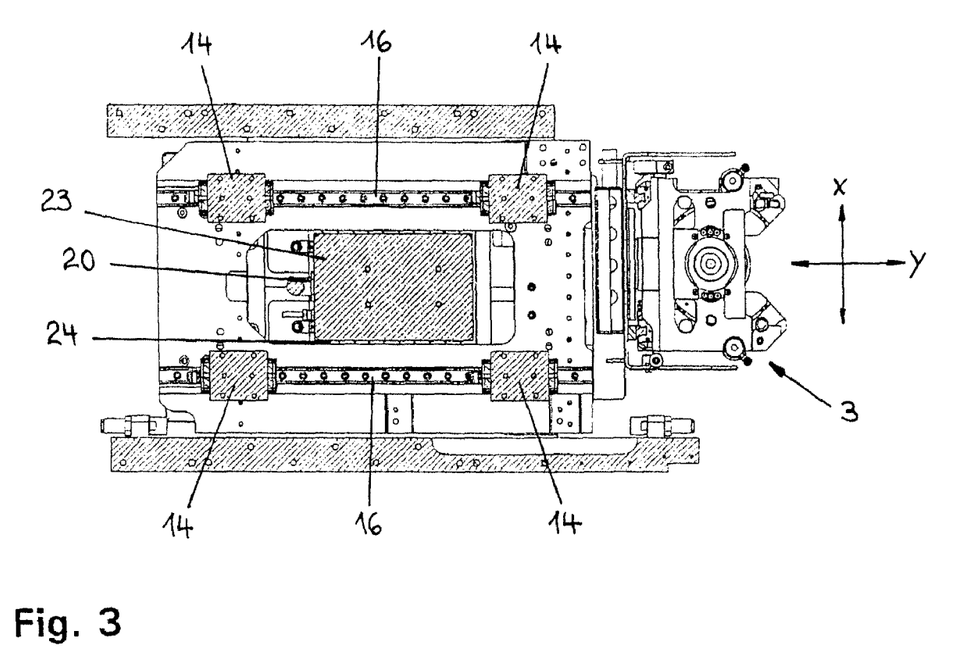
FIG. 3 shows a section along the line III-III in FIG. 2.

As shown in FIG. 2, the laser cutting head 3 is provided on a movement unit constructed in the form of a slide 10. The slide 10 is in turn supported on the upper frame leg 4 of the machine frame 5 of the machine tool 1 so as to be movable both in the x-direction and in the y-direction. The x-direction extends perpendicular to the plane of the drawing in FIG. 2.

For guiding of the slide 10 and the laser cutting head 3 attached thereto during movements in the x-direction and the y-direction, a guide system 11 is used. The latter comprises a y guide 12 and an x-guide 13 on a plate-like part of the slide 10.

Part of the y-guide 12 is formed by a total of four y-linear bearings 14 (FIG. 3), which are bolted to a support structure in the form of a housing 15 fixed to the machine frame. Two y linear bearings 14 in each case guide a y-guide rail 16 extending in the y-direction. When the slide 10 and the laser cutting head 3 move in the y-direction, the y-guide rails 16 move together with the slide 10 and the laser cutting head 3 relative to the y-linear bearings 14 fixed to the machine frame.

Figure 4:
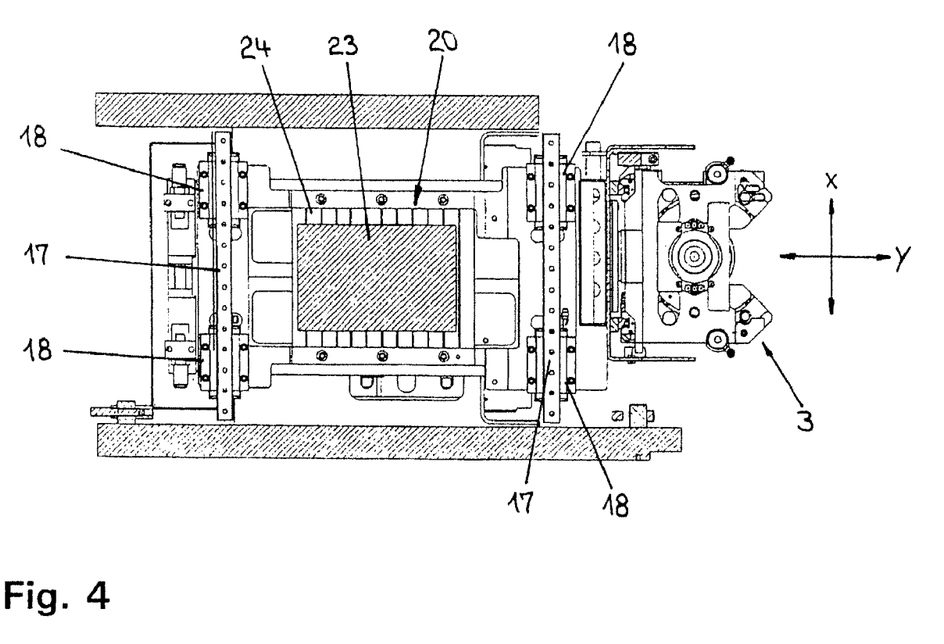
FIG. 4 shows a section along the line IV-IV in FIG. 2.

Connected to the y-guide rails 16 there are two x-guide rails 17 extending in the x-direction and spaced from each other in the y-direction (FIG. 4). The x-guide rails 17 in turn support a total of four x-linear bearings 18. Finally, the x-linear bearings 18 are fastened to the slide 10. When the slide 10 and the laser cutting head 3 move in the x direction, the slide 10 and the laser cutting head 3 are displaced together with the x-linear bearings 18 along the x-guide rails 17.

All in all, the guide system 11 for the laser cutting head 3 is configured in the manner of a cross slide. The cross-slide-type guide system 11 defines a horizontal movement plane of the slide 10 and thus of the laser cutting head 3, which is spanned by the x-coordinate axis and the y-coordinate axis.

To drive the slide 10 and the laser cutting head 3 in that horizontal movement plane, two drive units of the linear drive 9 are used, specifically an x-drive unit 19 and a y-drive unit 20.

Figure 5:
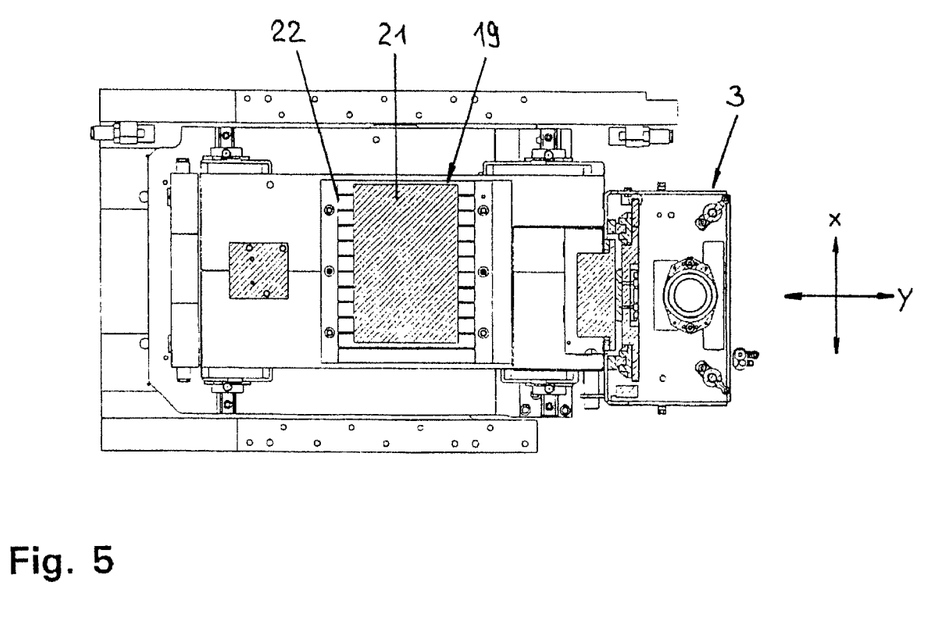
FIG. 5 shows a section along the line V-V in FIG. 2.

Considered individually, both the x-drive unit 19 and the y-drive unit 20 are conventional linear motors. Accordingly, the x-drive unit 19 comprises as the primary part 21 an exciting coil and, as the secondary part 22, permanent magnets arranged in a row in the x-direction (FIG. 5). In an analogous manner, a primary part 23, in the form of an exciting coil, and a secondary part 24 form the y-drive unit 20 (FIG. 4). The secondary part 24 of the y-drive unit 20 comprises a plurality of permanent magnets arranged one after another in the y-direction (FIG. 4). The length occupied by the permanent magnets of the secondary part 22 in the y-direction is matched to the length of travel of slide 10 and laser cutting head 3 in the y direction. Correspondingly, the dimensioning of the permanent magnets of the secondary part 24 in the x-direction takes account of the length of travel of slide 10 and laser cutting head 3 in that direction.

Of particular importance is the distribution of the primary parts 21, 23 and of the secondary parts 22, 24 between the slide 10, on the one hand, and the upper frame leg 4 or the machine frame 5, on the other hand.

As shown in FIG. 2, parts of the x-drive unit 19 and the y-drive unit 20 that are of the same kind are mounted on sides of the slide 10 that are opposite sides perpendicularly to the horizontal movement plane of the slide 10 and the laser cutting head 3. In the example illustrated, this is the secondary part 22 of the x-drive unit 19 and, disposed on the opposite side of the slide 10, the secondary part 24 of the y-drive unit 20. The secondary part 22 and the secondary part 24 are moved together with the slide 10 and the laser cutting head 3. Since the secondary parts 22, 24 are passive units, during movements of the slide 10 and the laser cutting head 3 it is advantageously unnecessary for any supply lines required for operation of the drive units 19, 20 to be carried along at the same time. In addition, the masses of the secondary parts 22, 24 are relatively small.

The primary part 21 of the x-drive unit 19 associated with the secondary part 22 is mounted on the upper frame leg 4 of the machine frame 5, more specifically on the housing 15 which is fixed to the machine frame. Accordingly, during movements of slide 10 and laser cutting head 3, the primary part 21 of the x-drive unit 19 remains stationary. Connection of the primary part 21 to the associated supply lines, especially connection of the exciting coil to the electrical power supply, is consequently made extremely simple. A corresponding situation is obtained at the y-drive unit 20. Disposed opposite the passive secondary part 24 attached to the slide 10 there is the primary part 23, which in turn is mounted on the housing 15 fixed to the machine frame and which consequently also keeps its mounted position during movements of the slide 10.

Transverse forces that occur between the primary part 21 and the secondary part 22, during operation of the x-drive unit 19 and between the primary part 23 and the secondary part 24, during operation of the y-drive unit 20, compensate for each other. With appropriate regulation of the exciting currents passed through the primary part 21 and the primary part 23, the value of the resultant of the transverse forces obtained at the x-drive unit 19 and at the y-drive unit 20 may amount to zero. In that case, the guide system 11 does not have to dissipate any load caused by transverse forces.

If the exciting currents through the primary part 21 and the primary part 23 are regulated in such a manner as to produce a resultant transverse force directed vertically upward in FIG. 2, the value of which corresponds to the weight of the unit formed by slide 10 and laser cutting head 3, that weight can even be dissipated by the upper frame leg 4 of the machine frame 5 without it being necessary for the guide system 11 to be used for that purpose.

Accordingly, a guide system 11 having a low load-carrying capacity is sufficient. The guide system 11 is of correspondingly small overall dimensions and the arrangement in its entirety proves to be correspondingly compact.

Referring to FIG. 2, a z-drive unit 25 is used for movement of the laser cutting head 3 in the z-direction. The z-drive unit 25 has a primary part 26 which is fixedly mounted on the slide 10 and a secondary part 27 which is connected to the laser cutting head 3. The z-drive unit 25 also is a linear motor of customary construction.

Figure 6:
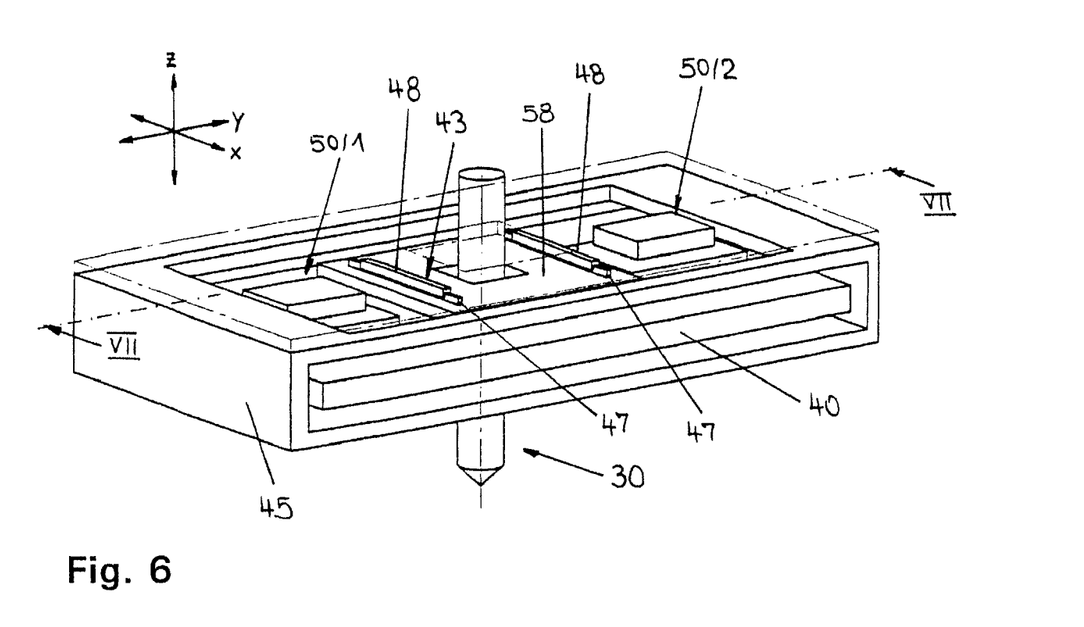
FIG. 6 is a perspective view of a second type of laser cutting head, including an associated linear drive for use on the punching/laser cutting machine shown in FIG. 1.
Figure 7:
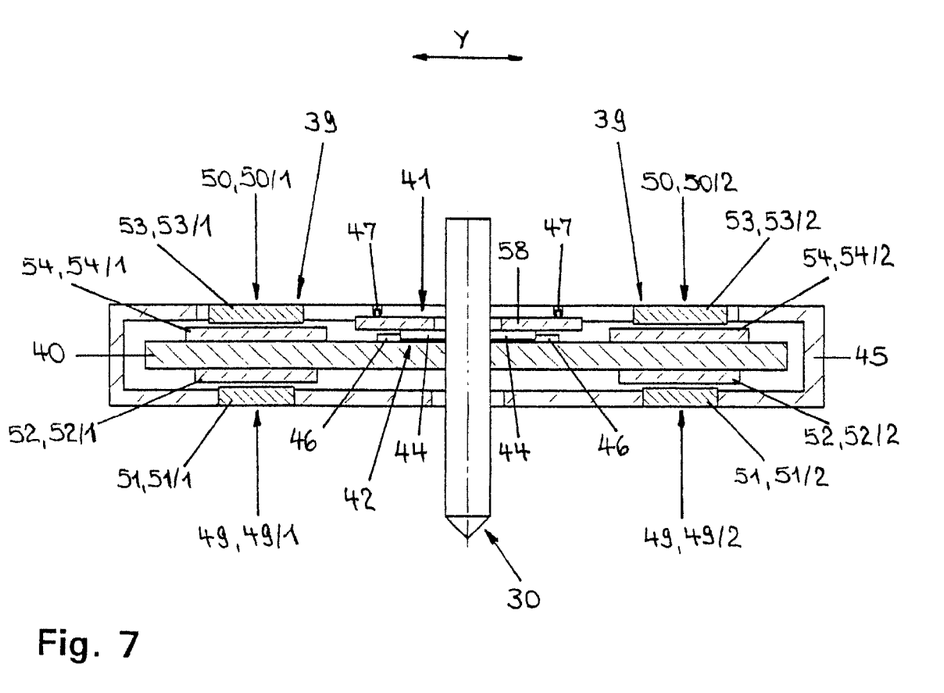
FIG. 7 shows a section along the line VII-VII in FIG. 6.

FIGS. 6 and 7 relate to an arrangement that may be provided on the machine tool 1 in place of the arrangement shown in FIGS. 2 to 5. The two arrangements correspond to each other in principle in their mode of operation.

As shown in FIGS. 6 and 7, a laser cutting head 30, shown highly schematically, is mounted as a functional unit on a slide 40 serving as a movement unit. The slide 40 can be moved together with the laser cutting head 30 in the x-direction and in the y-direction. In that process, the laser cutting head 30 and the slide 40 are driven by a linear drive 39. For guiding of the movement of laser cutting head 30 and slide 40, a guide system 41 is provided.

The guide system 41 is formed by a y-guide 42 and an x-guide 43. The y-guide 42 comprises y-linear bearings 44 and y-guide rails 46 which extend in the y-direction on both sides of the laser cutting head 30. The y-guide rails 46 are attached to the upper side of the plate-like slide 40. The y-linear bearings 44 are disposed on the underside of an intermediate plate 58 of the guide system 41 which is configured in the manner of a cross slide. On its upper side, the intermediate plate 58 is provided with x-guide rails 47 which extend in the x-direction and which are spaced from each other in the y direction. The x-guide rails 47 are guided by x-linear bearings 48 (FIG. 6). In the installed position, the x-linear bearings 48 are connected in a stationary manner to the upper frame leg 4 of the machine frame 5. In the manner described, the guide system 41 defines the horizontal movement plane of slide 40 and laser cutting head 30 which is spanned by the x-coordinate axis and the y-coordinate axis.

The linear drive 39 comprises an x-drive unit 49 and a y-drive unit 50. Both the x-drive unit 49 and the y-drive unit 50 are formed in two parts. A drive subunit 49/1 and a drive subunit 49/2 of the x-drive unit 49 and a drive subunit 50/1 and a drive subunit 50/2 of the y-drive unit 50 are respectively arranged on both sides of the laser cutting head 30.

A primary part 51 and a secondary part 52 of the x-drive unit 49 are each formed in two parts, as are a primary part 53 and a secondary part 54 of the y-drive unit 50. Accordingly, primary part elements 51/1, 51/2 and secondary part elements 52/1, 52/2 of the x-drive unit 49 and primary part elements 53/1, 53/2 and secondary part elements 54/1, 54/2 of the y-drive unit 50 are provided. The primary part elements 51/1, 51/2, 53/1, and 53/2 are exciting coils, while the secondary part elements 52/1, 52/2, 54/1, and 54/2 are formed by permanent magnets arranged in a row. Corresponding to the situation shown in FIGS. 2 to 5, in the case of the arrangement according to FIGS. 6 and 7 the secondary parts 52, 54 are attached on opposite sides of the slide 40 and the primary parts 51, 53 are connected to the upper frame leg 4 of the machine tool 1 and fixed to the frame. A housing 45 which is fixed to the machine frame is used for that purpose among others. Owing to the mirror-symmetrical arrangement of the x-drive unit 49 and the y-drive unit 50 with respect to the slide 40, it is also possible for drive-related transverse forces on the linear drive 39 to be compensated for.

In contrast to the example shown in FIGS. 2 to 5, in the case of the apparatus type shown in FIGS. 6 and 7 the center of gravity of the arrangement in its entirety is at the center of the guide system 41. Owing to the load situation obtained as a result, the y-guide 42 and the x-guide 43 may be of particularly small overall dimensions. At the same time, the movements of the laser cutting head 30 may be controlled with extraordinarily high precision.

For simplicity, a device for positioning the laser cutting head 30 in the z-direction is not shown in FIGS. 6 to 7.

A number of embodiments of the invention have been described. Nevertheless, it will be understood that various modifications may be made without departing from the spirit and scope of the invention. Accordingly, other embodiments are within the scope of the following claims.

What is claimed is:

1. A machine tool comprising:
a machine frame,
a functional unit,
a linear drive for the functional unit, and
a movement unit, the functional unit being connected in motion with the movement unit and the movement unit being movable by means of the linear drive in two axis directions of a movement plane,
wherein the linear drive comprises two drive units, each of which has a primary part and a secondary part disposed opposite the primary part, each drive unit being provided for movement of the movement unit in one of the axis directions of the movement plane of the movement unit, wherein the secondary part of each drive unit of the linear drive is attached to the movement unit and the primary part of the respective drive unit is attached to the machine frame,
wherein the secondary part of one drive unit is attached to a first side of the movement unit which, perpendicularly to the movement plane of the movement unit, is opposite a second side of the movement unit on which the secondary part of the other drive unit is attached, and
wherein a length occupied by each secondary part perpendicular to the axis direction of the drive unit comprising the secondary part corresponds to a length of travel of the movement unit in the axis direction perpendicular to the axis direction of the drive unit comprising the secondary part.

2. A machine tool according to claim 1, characterized in that the primary parts of the drive units comprise at least one exciting coil and the secondary parts of the drive units comprise at least one permanent magnet.

3. A machine tool according to claim 1, characterized in that there is a guide system for the movement unit and in that the linear drive is configured so that substantially no drive-related transverse forces in the transverse direction of the movement plane of the movement unit are absorbed by the guide system for the movement unit.

4. A machine tool according to claim 3, characterized in that the linear drive is configured to regulate the exciting currents of the primary parts of the drive units so that, during guiding of the movement unit, no drive-related transverse forces are absorbed by the guide system for the movement unit.

5. A machine tool according to claim 3, characterized in that the drive units are structurally configured so that, during guiding of the movement unit, no drive-related transverse forces are absorbed by the guide system for the movement unit.

6. A machine tool according to claim 5, characterized in that the drive units are of identical construction and the exciting currents of their primary parts are of equal magnitude.

7. A machine tool according to claim 1 wherein the machine tool is in the form of a laser processing machine, and the functional unit comprises a laser processing head.

8. A machine tool according to claim 3 wherein the guide system for the movement unit is in the form of a cross-slide.

9. A machine tool according to claim 3 wherein the guide system for the movement unit comprises a pair of guide rails, extending in the two axis directions, and a pair of sets of linear bearings, each set of bearings being configured to guide one of the guide rails.

10. A machine tool according to claim 3 wherein the guide system for the movement unit comprises a pair of guide rails, extending in the two axis directions, and a pair of sets of linear bearings, each set of bearings being configured to guide one of the guide rails.

11. A linear drive for driving a functional unit of a machine tool connectable in motion with a movement unit, the linear drive comprising:
  two drive units, each drive unit comprising a primary part and a secondary part disposed opposite the primary part and each drive unit defining one axis direction of a movement plane of the movement unit,
  wherein the two drive units are mounted on opposite sides of the movement unit such that the primary part and the secondary part of the one drive unit of the linear drive and the primary part and the secondary part of the other drive unit of the linear drive are arranged mirror-symmetrically with respect to the movement plane of the movement unit
  wherein the secondary part of each drive unit of the linear drive is attached to the movement unit and wherein the primary part of the respective drive unit is fixed to a machine frame of the machine tool,
  wherein the secondary part of one drive unit is attached to a first side of the movement unit which, perpendicular to the movement plane of the movement unit, is opposite a second side of the movement unit to which the secondary part of the other drive unit is attached, and
  wherein a length occupied by each secondary part perpendicular to the axis direction of the drive unit comprising the secondary part, corresponds to a length of travel of the movement unit in the axis direction perpendicular to the axis direction of the drive unit comprising the secondary part.

12. A linear drive according to claim 11, characterized in that the primary parts of the drive units comprise at least one exciting coil and the secondary parts of the drive units comprise at least one permanent magnet.

13. A linear drive according to claim 11, characterized in that there is a guide system for the movement unit and in that the linear drive is configured so that substantially no drive-related transverse forces in the transverse direction of the movement plane of the movement unit are absorbed by the guide system for the movement unit.

14. A linear drive according to claim 9, characterized in that the linear drive is configured to regulate the exciting currents of the primary parts of the drive units so that, during guiding of the movement unit, no drive-related transverse forces are absorbed by the guide system for the movement unit.

15. A linear drive according to claim 9, characterized in that the drive units are structurally configured so that, during guiding of the movement unit, no drive-related transverse forces are absorbed by the guide system for the movement unit.

16. A linear drive according to claim 15, characterized in that the drive units are of identical construction and the exciting currents of their primary parts are of equal magnitude.

* * * * *

UNITED STATES PATENT AND TRADEMARK OFFICE
CERTIFICATE OF CORRECTION

| | | |
|---|---|---|
| PATENT NO. | : 8,248,004 B2 | Page 1 of 1 |
| APPLICATION NO. | : 12/145968 | |
| DATED | : August 21, 2012 | |
| INVENTOR(S) | : Frank Schmauder | |

It is certified that error appears in the above-identified patent and that said Letters Patent is hereby corrected as shown below:

Column 1, line 10, delete "30, 2008." and insert --30, 2007.--.

Column 7, line 42 (Claim 11, line 42), delete "unit" and insert --unit,--.

Column 8, line 26 (Claim 14, line 26), delete "claim 9" and insert --claim 13--.

Column 8, line 32 (Claim 15, line 32), delete "claim 9" and insert --claim 13--.

Signed and Sealed this
Eleventh Day of December, 2012

David J. Kappos
*Director of the United States Patent and Trademark Office*